United States Patent [19]

Seybold

[11] Patent Number: 5,600,735
[45] Date of Patent: Feb. 4, 1997

[54] METHOD OF RECOGNIZING HANDWRITTEN INPUT

[75] Inventor: John L. C. Seybold, Portola Valley, Calif.

[73] Assignee: Motorola, Inc., Schaumburg, Ill.

[21] Appl. No.: 240,405

[22] Filed: May 10, 1994

[51] Int. Cl.$^6$ ............................................. G06K 9/34
[52] U.S. Cl. ................................. 382/178; 382/179
[58] Field of Search .......................... 382/174, 177, 382/178, 179, 186, 185

[56] References Cited

U.S. PATENT DOCUMENTS

| | | | |
|---|---|---|---|
| 4,206,442 | 6/1980 | Miyazaki et al. | 382/178 |
| 4,379,282 | 4/1983 | Bailey | 382/178 |
| 4,850,025 | 7/1989 | Abe | 382/177 |
| 5,062,141 | 10/1991 | Nakayami et al. | 382/176 |
| 5,138,668 | 8/1992 | Abe | 382/177 |

*Primary Examiner*—Joseph Mancuso
*Attorney, Agent, or Firm*—Donna Rogers Maddox

[57] ABSTRACT

The present invention determines whether two discrete continuous segments of handwritten input $S_1$ (210) and $S_2$ (220) form part of the same handwritten input or are part of more than one, separate handwritten inputs. The present method calculates one or more substantially parallel distance disposed substantially parallel to the writing access (210) and compares these distances to one or more predefined thresholds. The predefined thresholds specify minimum distance measures which must be exceeded by the substantially parallel distances for the discrete continuous segments to be judged as belonging to separate segments of handwritten input.

9 Claims, 3 Drawing Sheets

METHOD OF RECOGNIZING HANDWRITTEN INPUT

FIELD OF THE INVENTION

This invention relates generally to handwriting recognition, and more particularly to recognition of individual words.

BACKGROUND OF THE INVENTION

Machine recognition of human handwriting is a very difficult problem, and with the recent explosion of pen-based computing devices, has become an important problem to be addressed. Machine recognition of human handwriting has various present applications.

One example of the current application for machine recognition of human handwriting is found in personal digital assistants. Typically these type of products have a touch sensitive screen upon which a user can impose handwriting. These devices then function to digitize the handwritten input, such as alphanumeric input, and thereafter process the input in an attempt to recognize the information content of the handwriting.

Pursuant to one prior art handwriting recognition technique, one makes a best determination as to the identity of each alphanumeric character in sequence, with the resulting string of characters comprising the result of the recognition activity. There are a variety of drawbacks to this approach. It is hindered by the difficulty of identifying spatial boundaries of the candidate inputs (in this case alphanumeric characters to be recognized. When these boundaries are not located correctly, it is impossible to recognize the character accurately, since it will either be lacking pieces or will incorporate extraneous material from adjacent characters.

One significant problem with machine recognition of human handwriting is the ability to recognize the end of one input and the beginning of the next input. For example, a significant problem exists in locating the end of one handwritten input segment, word, or alphanumeric input, from the beginning of the subsequent handwritten input segment, word, or alphanumeric input. Poor recognition of such breaks in the handwritten input results in poor, inaccurate interpretation of the information content of the handwritten input.

Accordingly, a need exists for a handwriting recognition technique that can detect the end of a first handwritten input segment from the beginning of a second handwritten input segment, in the handwritten input and thereby provide a more accurate interpretation of the information content of the handwritten input.

SUMMARY OF INVENTION

It is therefore an object of the invention to provide a method to determine whether two discrete continuous segments of handwritten input form part of the same handwritten input or are part of more than one, separate handwritten inputs. This invention has many embodiments and advantages, including but not limited to the following aspects.

According to a first aspect of the invention, the invention provides a method comprised of the following steps. Handwritten character input is received. This handwritten character input is comprised of at least two discrete continuous segments. At least one distance between the two discrete continuous segments is calculated. The distance calculated is substantially parallel to the writing axis of the two discrete continuous segments. This distance is derived by calculating a plurality of distances between the two discrete continuous segments which are substantially parallel to the writing axis of the two discrete continuous segments and identifying which of the plurality of distances has a smallest value. The calculated distance is used to determine whether the two discrete continuous segments belong to separate handwritten character inputs.

According to a second aspect of the invention, the invention provides a method comprised of the following steps. Handwritten character input is received. The handwritten character input is comprised of at least two discrete continuous segments. At least one distance is calculated between the two discrete continuous segments, the distance being substantially parallel to the writing axis of the two discrete continuous segments. A boundary for each of the discrete continuous segments is identified which is perpendicular to the writing axis. A distance between the boundaries for the two discrete continuous segments is calculated. As a result, the distance between the boundaries for the two discrete continuous segments is used to determine whether the two discrete continuous segments belong to separate handwritten inputs.

According to a third aspect of the invention, the invention provides a method comprised of the following steps. Handwritten input comprised of two discrete continuous segments is received, where the handwritten input has a first axis defined along a direction of writing of the handwritten input. A boundary for each of the two discrete continuous segments is determined. The boundary is defined along a second axis perpendicular to the first axis through a point along the first axis for each of the discrete continuous segments nearest the boundary of the other discrete continuous segment. A distance parallel to the first axis between the boundaries is calculated. This distance will determine whether the two discrete continuous segments are separate handwritten inputs. This is achieved by comparing the distance to a first predetermined threshold. If the distance is greater than the first predetermined threshold, then the two discrete continuous segments are separate handwritten inputs.

When the distance is not greater than the first predetermined threshold, the two discrete continuous segments are each separated into a plurality of sections. Each of the plurality of sections is analyzed to determine which of the plurality of sections has a portion of each of the two continuous segments. For each of the plurality of sections where the portion of each of the two continuous segments has been found, a segment distance between the portions of the two continuous segments that are nearest to each other is calculated. Then it is determined from both distances whether the two continuous segments are separate handwritten input.

According to a fourth aspect of the invention, a method is provided comprising the step of processing first and second discrete continuous segments representing handwritten input entered along a writing axis to identify a first boundary for the first discrete continuous segment and a second boundary for the second discrete continuous segment, the first boundary representing a greatest displacement of the first discrete continuous segment from a reference and the second boundary representing a least displacement of the second discrete continuous segment from the reference. A first distance is calculated between the first and second boundary, the first distance being substantially parallel to the writing axis. It is determined that the first and second discrete continuous segments represent a separate handwritten character when the first distance exceeds a first threshold. A second distance is determined when the first distance does not at least exceed the first threshold, the second distance being substantially parallel to the writing axis and selected as a minimum distance from a plurality of distances between left-most points of the first discrete continuous segment and right-most points of the second discrete continuous segment in a like plurality of bands substantially parallel to the writing axis. It is determined that the first and second discrete continuous segments represent a separate handwritten character when the second distance exceeds a second threshold.

According to a fifth aspect of the invention, the invention provides a method comprised of the following steps. Handwritten input comprised of at least two discrete continuous segments positioned along a writing axis is received. Two boundaries are defined which are substantially perpendicular to the writing axis. The first boundary is calculated by finding the point in the first discrete continuous segment that has the largest displacement from a reference point along the writing axis. The second boundary is calculated by finding the point in the second discrete continuous segment that has the smallest displacement from the reference point along the writing axis. If it is determined that the largest displacement of the point in the first discrete continuous segment is greater than the smallest displacement of the point in the second discrete continuous segment, a negative value will result. As a result, the negative value is used to determine whether the first and second discrete continuous segments belong to separate handwritten inputs.

DETAILED DESCRIPTION OF THE PREFERRED EMBODIMENTS

Figure 1:
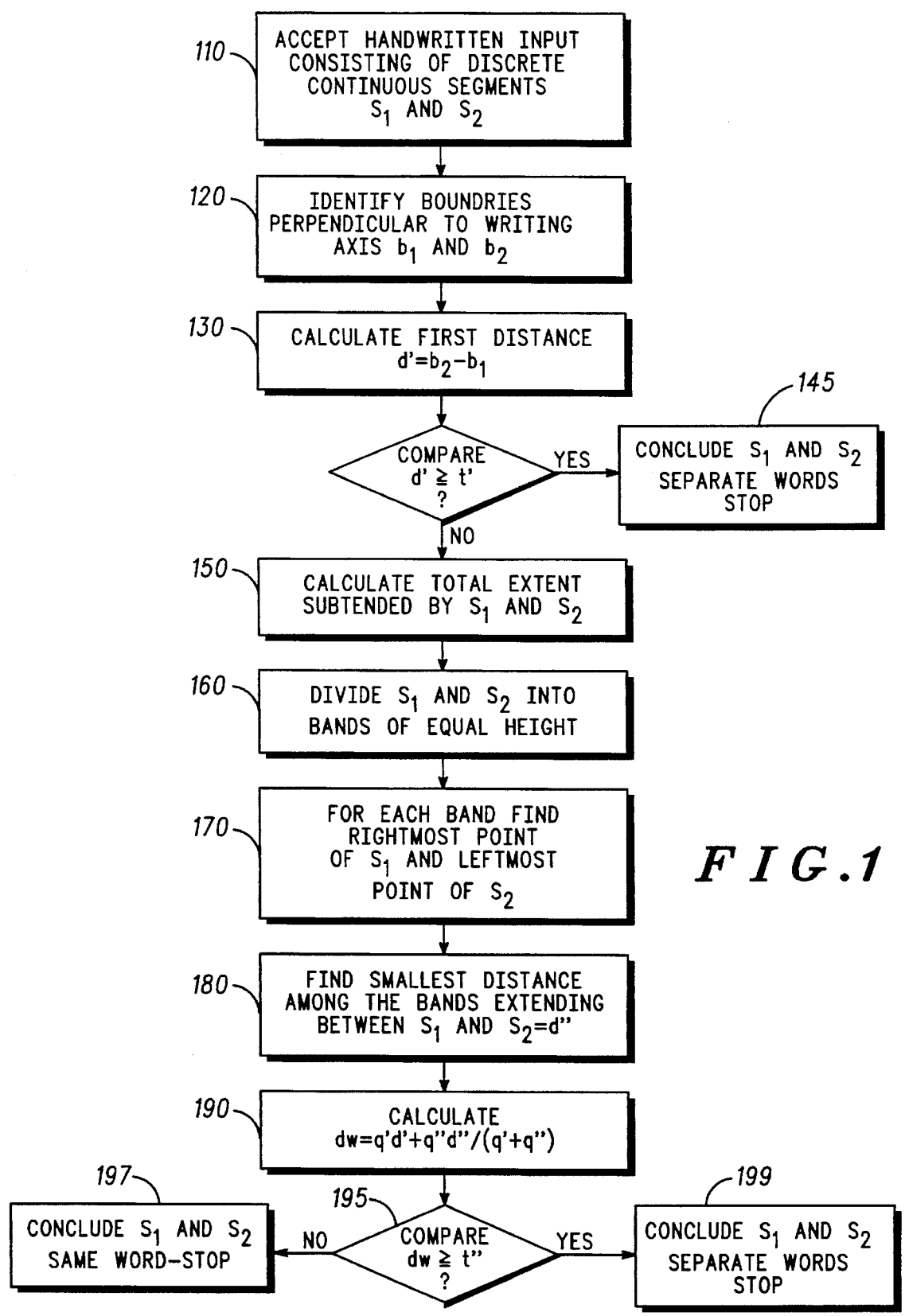
FIG. 1 Illustrates a flow diagram of operation in accordance with a preferred embodiment of the present invention.

Typically, handwritten character input is collected from the user in the form of discrete continuous segments. A discrete continuous segment consists of one or more pen strokes, where a pen stroke is the mark left by a pen during its period of contact with an input device such as a digitizing tablet or paper. A stroke is represented as a sequence of points sampled at approximately regular intervals by the input device. Each point is described at minimum by an X coordinate and a Y coordinate. Strokes may be captured electronically using a digitizing tablet, or in an alternative embodiment may be derived from a scanned or faxed image through a process of line detection in the image; such methods of capturing input electronically are understood in the art.

Generally, the present invention as disclosed determines whether two discrete continuous segments form part of the same handwritten character input or part of more than one handwritten character input. In the present invention one or more discrete continuous segments are the units of handwritten input being recognized. Handwritten input is input which is captured electronically that includes but is not limited to the following: handwritten input; electronic input; input captured through pressure, such as stamped input; input that is received electronically, such as via facsimile, pager, or other device. For example—the present invention determines whether two discrete continuous segments form part of the same word or whether they form part of separate words. In a preferred method, the present invention calculates one or more substantially parallel distances disposed substantially parallel to the writing axis, and compares these distances to one or more predefined thresholds. The predefined thresholds specify minimum distance measures which must be exceeded by the substantially parallel distances for the discrete continuous segments to be judged as belonging to separate handwritten input, for example separate handwritten words. The writing axis is the line along which the handwritten input is added. The writing direction is the direction in which each subsequent handwritten input is added. In English, handwritten input is added typically along a horizontal writing axis with each subsequent alphanumeric input following horizontally after the previous input in a writing direction that is left to right. Various other writing axis and writing directions alternatives are possible with implementation of the teachings of the present invention.

In a preferred embodiment, the handwriting axis is horizontal and the handwritten input forms a series of words. In this preferred embodiment, the substantially parallel distances are calculated horizontally, and the output tells whether discrete continuous segments belong to separate words. In an alternative preferred embodiment, the handwriting axis is horizontal and the handwritten input forms a series of separate characters, which may be alphanumeric characters, ideographic characters as found in languages such as Chinese, or other forms of characters or symbols of written communications. In this alternative embodiment, the output tells whether the discrete continuous segments belong to separate characters. In another preferred embodiment, the handwriting axis is vertical and the handwritten input forms a series of separate characters, which may be alphanumeric characters, ideographic characters, or other handwritten input. In this preferred embodiment, the writing axis is vertical and the substantially parallel distances are aligned vertically; the output tells whether the discrete continuous segments belong to separate characters. In yet another preferred embodiment, the handwriting axis is vertical and the handwritten input forms a series of separate words, alphanumeric input, or other handwritten input, such as a vertical list of words, or numbers. In this preferred embodiment, the writing axis is vertical and the substantially parallel distances are aligned vertically; the output tells whether the discrete continuous segments belong to separate handwritten input, such as separate words.

As disclosed above and as will be discussed further, the present invention demonstrates through the disclosure of several of the preferred embodiments that the writing axis may exist at any angle and the handwritten input may be interpreted more generally as corresponding to discrete elements (including but not limited to characters and words) containing one or more discrete continuous segments. The application of the methods described herein to any of various preferred embodiments requires only a change in the coordinate system used and such modifications can be made in accordance with the teachings presented.

Figure 2:
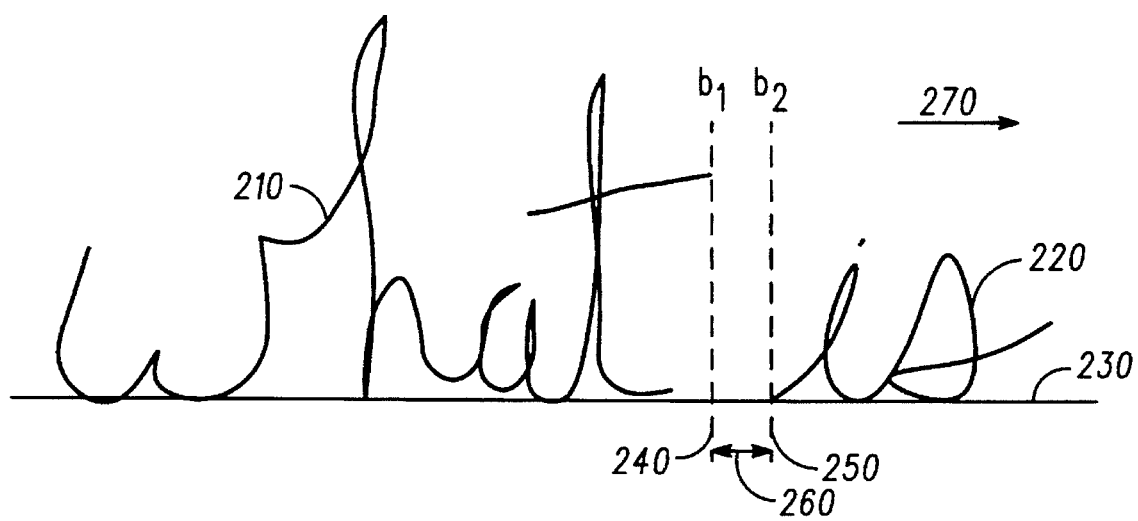
FIG. 2 Illustrates a graphical view of an illustrative display in accordance with a preferred embodiment of the present invention.

Referring now to FIG. 1 and FIG. 2, a preferred method of the present invention is illustrated. The present invention is applicable to one or more handwritten inputs of discrete continuous segments. The preferred embodiments of the present invention, are applicable to two or more handwritten inputs of discrete continuous segments. The use of only two discrete continuous segments $S_1$ and $S_2$ is for illustrative purposes. In the preferred method of the flow chart of FIG. 1 and illustrated in FIG. 2, handwritten input consisting of two discrete continuous segments $S_1$ and $S_2$ (110) is accepted by a device, such as a PDA, or other device. Other devices which function to receive handwritten input include but are not limited to the following: computers, modems, pagers, telephones, digital or interactive or other televisions, devices having a digitizing tablet, facsimile devices, scanning devices, and any device with the ability to capture handwritten input. Preferably, upon acceptance of the handwritten input the, substantially perpendicular boundaries $b_1$ and $b_2$ between the discrete continuous segments $S_1$ and $S_2$ are identified (120, 240, 250). The boundaries $b_1$ and $b_2$ which are substantially perpendicular to the writing axis are determined by finding the point in the stroke sequence $S_1$ that has the largest displacement along the writing direction and the point in the stroke sequence $S_2$ that has the smallest displacement along the writing direction (120). The substantially perpendicular boundary $b_1$ is the displacement values of the point in the stroke sequence $S_1$ that has the largest displacement along the writing direction. The substantially perpendicular boundary $b_2$ is the displacement values of the point in the stroke sequence $S_2$ that has the smallest displacement along the writing direction. By calculating the displacement in the writing direction of each point in $S_1$ in turn and comparing that value to a stored value that is initially a very large negative number, the substantially perpendicular boundary $b_1$ that has the largest displacement along the writing direction can be determined. If the calculated displacement value is larger than the stored value, the stored value is replaced with the calculated displacement value. Once all the points have been examined, the stored value will contain the value of the largest displacement value found in the stroke sequence. A similar procedure, starting with a large positive initializing value, can be used to discover the point in $S_2$ that has the smallest displacement along the writing direction by calculating the displacement in the writing direction of each point in $S_2$ in turn and comparing that value to a stored value that is initially a very large positive number. If the calculated displacement value is less than the stored value, the stored value is replaced with the calculated displacement value. The preferred method then calculates a first substantially parallel distance d', where $d'=b_2-b_1$ (130 and 260 in FIG. 2 ).

Referring to FIG. 1, the first substantially parallel distance d' is compared to a first predetermined threshold t'. If d' is greater than or equal to (>=) t' the preferred method concludes that the first continuous discrete segment $S_1$ and the second continuous discrete segment $S_2$ belong to different segments of handwritten input (145). By way of example if d' is greater than (>) t' the preferred method concludes $S_1$ and $S_2$ are different words, characters, or other elements of handwritten input. The selection of a predetermined threshold t' is a value made in accordance with the specific embodiment. Choice of a threshold t' will be discussed in further detail elsewhere.

Figure 5:
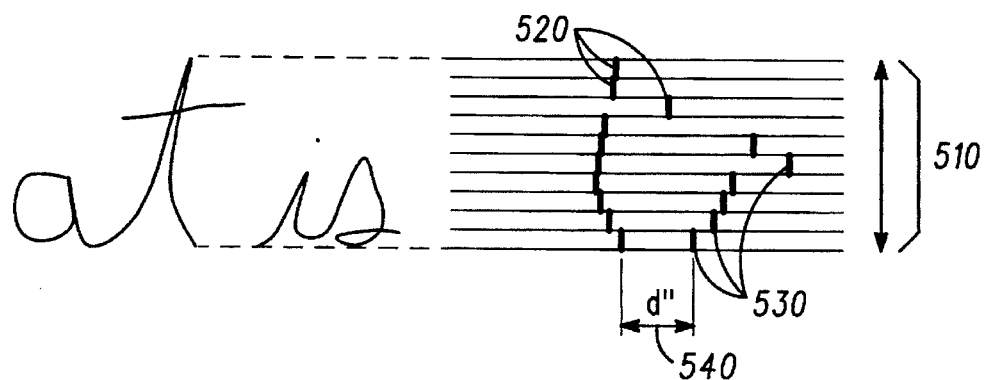
FIG. 5 Illustrates a graphical view of an illustrative display in accordance with a preferred embodiment of the present invention.

If the value of d' is smaller, or less than, the threshold value t' further processing occurs. To determine if the discrete continuous segments $S_1$ and $S_2$ form separate discrete continuous segments of handwritten input, such as separate words, characters, or other elements, a second substantially parallel distance d" is calculated as discussed in detail in association with FIG. 5. The second substantially parallel distance d" is found by calculating several substantially parallel distances and choosing the shortest of those distances. In a preferred embodiment, this is done by first calculating the maximum extent perpendicular to the writing axis subtended by $S_1$ and $S_2$ together (150). The extent is then divided into a number of bands of equal height substantially parallel to the writing axis (160) (See FIG. 5 showing the division of the extent of both $S_1$ and $S_2$ divided into parallel distances 510). The substantially parallel distance between $S_1$ and $S_2$ for each band (170) is then found. The smallest or shortest substantially parallel distance between $S_1$ and $S_2$ from among the plurality of bands is selected as d" (180) (represented in FIG. 5 as 540). In the preferred method represented in FIG. 1, once the substantially horizontal distance d" is found, the distance d" and the first substantially horizontal distance d' are combined to aid in making a final decision that $S_1$ and $S_2$ are part of the same handwritten input or are parts of separate discrete continuous segments of handwritten input. A weighted average $d_w$ of d' and d" is calculated. A preferred weighted average $d_w$ equation is q'd'+q"d"/(q'+q"). It has been found by empirical tests on actual handwriting data that a weighted average $d_w$ of d' and d" is more accurate than either alone. In one preferred embodiment, q'=q", but it may be possible to optimize this further by a judicious choice of q' and q" which are not identical. Additionally, q' and q" can each be equal to zero, but not at the same time.

The weighted average $d_w$ is compared against a second threshold t". If the weighted average $d_w$ is less than or smaller than t" the preferred method concludes that $S_1$ and $S_2$ are part of the same segment of handwritten input (197). If the weighted average $d_w$ is larger than or equal to t" the preferred method concludes that $S_1$ and $S_2$ are different continuous discrete segments of handwritten input and the preferred method concludes with that result (199).

The preferred method of selecting t' and t" is a detail of the specific embodiment. In one embodiment, t' may be set by measuring the value of d' across a large set of data and choosing the value that best distinguishes real dividing points from false choices. In another preferred embodiment, t' may be set to a constant value that corresponds to some fraction of the distance between input guides on the input device. In another preferred embodiment, t' may vary dynamically as a fraction of the measured extent of $S_1$ and $S_2$ perpendicular to the writing axis. In another embodiment, t' may be set explicitly by the user before the method is invoked. In the preferred embodiment illustrated, t' is set to be ⅓ of the measured extent of $S_1$ and $S_2$ perpendicular to the writing axis, which gives a good result for English, alphanumeric text. Many other ways of setting t' may be considered and may be optimal for different solutions. The various ways of determining t" in different embodiments are similar to those described for determining t'.

In FIG. 2, a graphical representation is given, for a preferred embodiment. In this embodiment, the discrete continuous segments, $S_1$ (210) and $S_2$ (220), correspond to English words, the writing axis (230) is horizontal, and the writing direction (270) is left to right. In this preferred embodiment, the displacement along the writing direction for any point is simply the value of the X coordinate for that point, so the substantially perpendicular boundary $b_1$ (240) is the value of the X coordinate of the rightmost point in $S_1$ (210) and the substantially perpendicular boundary $b_2$ (250) is the value of the X coordinate of the leftmost point in $S_2$ (220). The substantially parallel distance d' (260) is the distance extending between $b_1$ and $b_2$.

Figure 3:
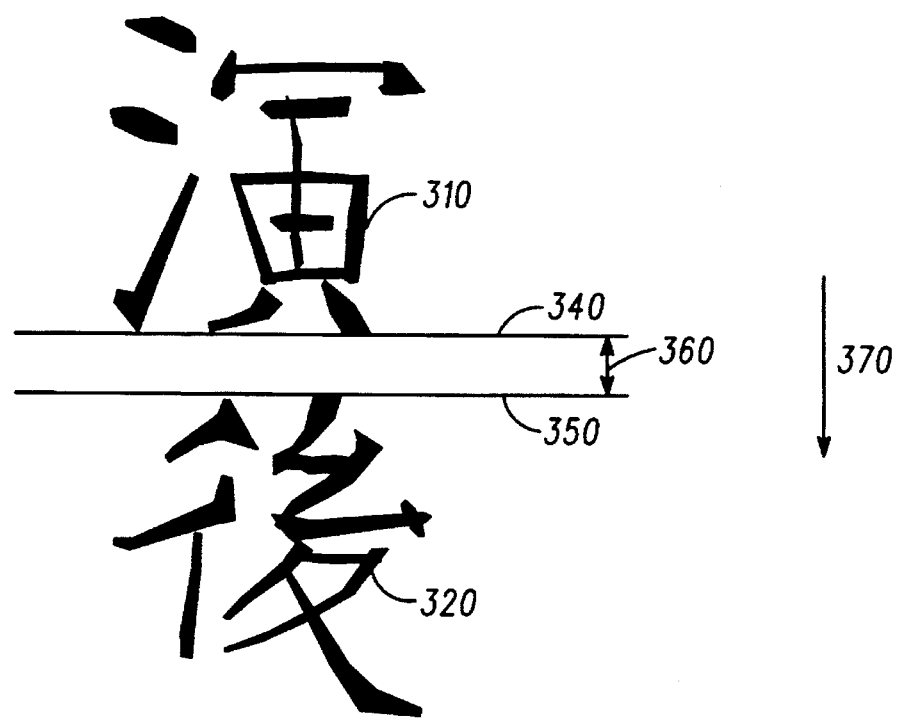
FIG. 3 Illustrates a graphical view of an illustrative display in accordance with a preferred embodiment of the present invention.

Alternatively, as illustrated in FIG. 3, the discrete continuous segments $S_1$ (310) and $S_2$ (320) correspond to Chinese characters, the writing axis is vertical, and the writing direction (370) is top to bottom. In this embodiment, the displacement along the writing direction (370) for any point is simply the value of the Y coordinate for that point multiplied by $-1$ (assuming a standard coordinate system in which Y increases as one moves from bottom to top), so the substantially perpendicular boundary $b_1$ (340) is the value of the Y coordinate times $-1$ of the bottommost point in $S_1$ (310) and the substantially perpendicular boundary $b_2$ (350) is the value of the Y coordinate times $-1$ of the topmost point in $S_2$ (320).

In other embodiments, the values for $b_1$ and $b_2$ can be calculated by applying a simple geometric rotation of the handwritten input to line up the writing axis with one of the cardinal axes of the coordinate system, and then applying the procedure just described. This is a straightforward operation that will be understood by persons in conjunction with the teachings presented here. Alternatively, other embodiments may calculate the displacements of the points along the writing direction, when the writing direction does not line up with one of the cardinal axes of the coordinate system, by a simple geometric projection of the discrete continuous segments onto the writing axis and then using trigonometry to calculate the displacement of the projected points from the origin of the coordinate system. This is a well-understood mathematical procedure that can be applied to the teachings herein.

Figure 4:
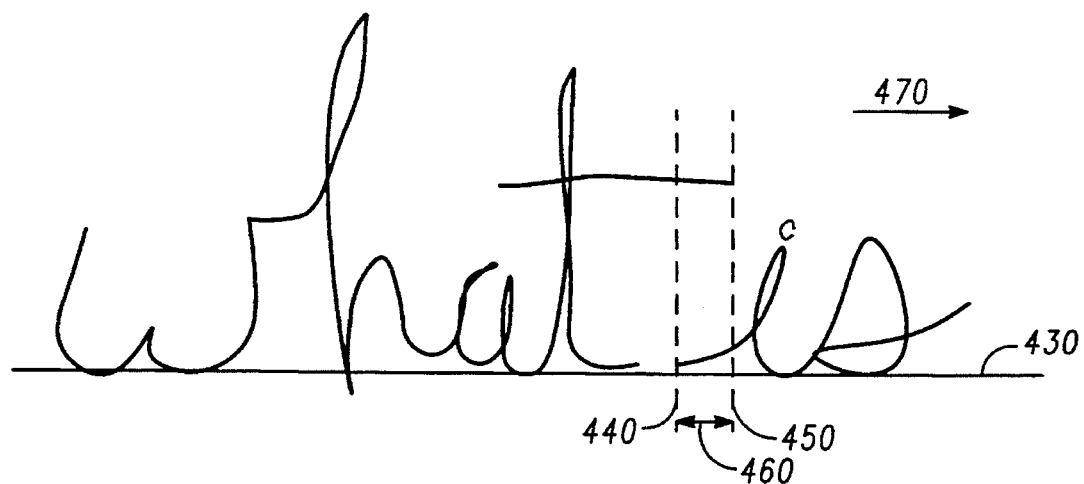
FIG. 4 Illustrates a graphical view of an illustrative display in accordance with an alternative preferred embodiment of the invention.

As stated previously, if d' is smaller than t', the processing continues. In many cases, segments that do in fact belong to separate words or characters are positioned in such a way that d' is small or even negative, but it is still possible to determine that $S_1$ and $S_2$ belong to different words or characters. FIG. 4 shows an example of this situation for an embodiment in which $S_1$ (410) and $S_2$ (420) are English words. In this example, d' (460) is actually negative, and $b_1$ (440) is larger than $b_2$ (450). In this example, the writing axis (430) is horizontal and the writing direction (470) is left to right.

In one embodiment in which the writing axis is horizontal, the maximum extent perpendicular to the writing axis subtended by $S_1$ and $S_2$ is calculated by finding the minimum and maximum Y coordinate values present in $S_1$ and $S_2$. To find the minimum Y coordinate value, a stored value is initialized with a very large positive value, and then every point in $S_1$ and $S_2$ is examined in turn, and if its Y coordinate value is smaller than the stored value, the stored value is assigned that Y coordinate value. A similar method is used to find the maximum Y coordinate value. By subtracting the maximum and minimum Y coordinate values, the extent perpendicular to the writing axis can be calculated. All points in $S_1$ and $S_2$ lie within this extent.

In a preferred embodiment, this process can be made more efficient by considering only a subset of the points in $S_1$ and $S_2$ such that only a fixed number of points near the boundary in question are considered, since these are the ones most likely to affect the measure being derived.

In an alternative embodiment, in which the writing axis is vertical, the maximum extent perpendicular to the writing axis subtended by $S_1$ and $S_2$ is calculated by finding the minimum and maximum X coordinate values present in $S_1$ and $S_2$. To find the minimum X coordinate value, a stored value is initialized with a very large positive value, and then every point in $S_1$ and $S_2$ is examined in turn, and if its X coordinate value is smaller than the stored value, the stored value is assigned that X coordinate value. A similar method is used to find the maximum X coordinate value. By subtracting the maximum and minimum X coordinate values, the extent perpendicular to the writing axis can be calculated.

In an alternative embodiment, where the writing axis is neither horizontal nor vertical, the image plane can be rotated to align the writing axis with the X or Y axis of the coordinate system, as described above in the calculation of the substantially parallel distance d' when the writing axis was neither horizontal nor vertical.

Once the extent perpendicular to the writing axis has been found, a preferred embodiment divides this extent into bands substantially parallel to the writing axis, such that each band describes a narrow slice through $S_1$ and $S_2$. Within each band, the point in $S_1$ with the largest displacement in the writing direction is found, and the point in $S_2$ with the smallest displacement in the writing direction is found. This can be done efficiently with respect to $S_1$ by initializing a stored value for each band to a very large negative number. Each point in $S_1$ is checked in turn. First, its displacement perpendicular to the writing axis is checked to see which band it lies in. Since the bands span the entire extent of $S_1$ and $S_2$ perpendicular to the writing axis, it is guaranteed that a band can be found for any point in $S_1$ and $S_2$. If the preferred embodiment described above for calculating the perpendicular extent by considering only a subset of points in $S_1$ and $S_2$, the perpendicular extent may not contain all points in $S_1$ and $S_2$, and so each point must be checked to ensure that it lies within a band. If it does not, it is not considered further. Once the band is identified, the displacement of the point in the writing direction is compared to the stored value for that band, and if the displacement is larger, it is assigned to the stored value. Once all of the points in $S_1$ have been checked in this way, the stored value in each band will contain the largest displacement of the point with the largest displacement encountered in that band in $S_1$. If there were no points in $S_1$ lying within a given band, the stored value will remain as the very large negative initializing value. A similar procedure, using a second stored value in each band initialized to a large positive number, is used with respect to $S_2$ to find the minimum displacement of the point with the minimum displacement in the writing direction within each band in $S_2$. If there are no points for a given band in $S_2$, the second stored value for that band remains at its large initialized value.

At the end of this operation, for each band there are two stored values corresponding to the largest displacement in the writing direction of $S_1$ in the band and the smallest displacement in the writing direction of $S_2$ in the band. If either stored value has not changed from its very large negative or positive initializing value, then the information for that band is not used in any further calculations. Otherwise, a distance is calculated for each band by subtracting the stored value for the displacement of the point in $S_1$ from the stored value for the displacement of the point in $S_2$. The smallest of these distances is found by examining the distance for each band in turn and storing the smallest one found. This smallest distance is the substantially horizontal distance d". If d" is less than 0, which can occur if $S_1$ and $S_2$ touch or overlap, it is assigned the value 0.

One embodiment in which the writing axis is horizontal and the writing direction is left to right is shown in FIG. 5. In this embodiment, the number of bands (510) is 10. The bands (510) are shown adjacent to the handwritten input for clarity. The rightmost point of $S_1$ lying within each band is found (520) and the leftmost point of $S_2$ lying within that band is also found (530). This is done with respect to $S_1$ by initializing a stored value for each band to a very large negative number. Each point in $S_1$ is checked in turn. First, its Y coordinate is checked to see which band it lies in. Since the bands span the entire height, extent (540) of $S_1$ and $S_2$, it is guaranteed that a band can be found for any point in $S_1$ and $S_2$. Once the band is identified, the X coordinate of the point is compared to the stored value for that band, and if the X coordinate is larger, it is assigned to the stored value. Once all of the points in $S_1$ have been checked in this way, the stored value in each band will contain the X coordinate of the rightmost point encountered in that band in $S_1$. If there were no points in $S_1$ lying within a given band, the stored value will remain as the very large negative initializing value. A similar procedure with respect to $S_2$, using a second stored value in each band initialized to a large positive number, is used to find the X coordinate of the leftmost point in each band in $S_2$.

As described previously, the value of d" is computed from the stored locations for each band. The smallest, or shortest, substantially parallel distance between $S_1$ and $S_2$ from among the plurality of bands is selected as d". The distance d" is then combined with d' via a weighted average $d_w$, and compared to t". Upon comparison with t" the method of the present invention concludes whether the discrete continuous segments $S_1$ and $S_2$ belong to the same handwritten input or separate handwritten inputs.

It will be apparent to those skilled in the art that the disclosed invention may be modified in numerous ways and may assume many embodiments other than the preferred forms particularly set out and described above. Accordingly, it is intended by the appended claims to cover all modifications of the invention that fall within that fall within the true spirit and scope of the invention and its equivalents.

What is claimed is:

1. A method comprising the steps of:

receiving handwritten character input, which handwritten character input is comprised of at least a first and a second discrete continuous segment:

calculating of at least one distance between the first and second discrete continuous segments, the distance being substantially parallel to a writing axis of the first and second discrete continuous segments including the steps of:

calculating a plurality of distances between the first and second discrete continuous segments which are substantially parallel to the writing axis of the first and second discrete continuous segments:

identifying which of the plurality of distances has a smallest value; and using the distance to determine whether the first and second discrete continuous segments belong to separate handwritten character inputs.

2. The method of claim 1, wherein the step of using the parallel distance to determine whether the first and second discrete continuous segments belong to separate handwritten inputs includes the step of determining whether the first and second discrete continuous segments belong to separate handwritten inputs based upon the smallest value of the plurality of distances.

3. A method comprising the steps of:

receiving handwritten character input, which handwritten character input is comprised of at least a first and a second discrete continuous segment;

calculating at least one distance between the first and second discrete continuous segments, the distance being substantially parallel to a writing axis of the first and second discrete continuous segments;

identifying a boundary for each of the first and second discrete continuous segments, which boundary for each of the first and second discrete continuous segments is substantially perpendicular to the writing axis;

calculating a distance between the boundaries for the first and second discrete continuous segments; and using the distance between the boundaries for the first and second discrete continuous segments to determine whether the first and second discrete continuous segments belong to separate handwritten inputs.

4. A method comprising the steps of:

receiving handwritten input comprising first and second continuous segments, the handwritten input having a first axis defined along a direction of writing of the handwritten input;

determining a boundary for each of the first and second continuous segments, the boundary for each of the first and second continuous segments being defined along a second axis perpendicular to the first axis through a point along the first axis for each of the first and second continuous segments nearest the boundary of the other of the first and second continuous segments;

calculating a distance parallel to the first axis between the boundaries; and determining from the distance whether the first and second continuous segments are separate handwritten inputs, including the steps of:

comparing the distance to a first predetermined threshold;

determining that the first and second continuous segments are separate handwritten inputs when the distance is greater than the first predetermined threshold;

separating each of the first and second continuous segments into a plurality of sections when the distance is not greater than the first predetermined threshold;

analyzing each of the plurality of sections to determine which of the plurality of sections has a portion of each of the first and second continuous segments;

for each of the plurality of sections where the portion of each of the first and second continuous segments has been found, calculating a segment distance between the portions of the first and second continuous segments that are nearest to each other; and determining from the distance and the segment distance whether the first and second continuous segments are separate handwritten input.

5. A method according to claim 4 wherein the step of determining from the distance and the section distance whether at least first and second continuous segment are separate handwritten input comprises the steps of:

calculating a weighted average of the distance and the segment distance;

comparing the weighted average to a second predetermined threshold;

determining that the at least first and second continuous segment are separate handwritten input if the weighted average is greater than the second predetermined threshold; and determining that the at least first and second continuous segment are not separate handwritten input if the weighted average is not greater than the second predetermined threshold.

6. A method according to claim 4 wherein the sections are distributed in a direction perpendicular to the writing axis.

7. A method according to claim 6 wherein the sections are of equal breadth in a direction perpendicular to the writing axis.

8. A method, comprising the steps of:

processing first and second discrete continuous segments representing handwritten input entered along a writing axis to identify a first boundary for the first discrete continuous segment and a second boundary for the second discrete continuous segment, the first boundary representing a greatest displacement of the first discrete continuous segment from a reference and the second boundary representing a least displacement of the second discrete continuous segment from the reference;

calculating a first distance between the first and second boundary, the first distance being substantially parallel to the writing axis;

determining that the first and second discrete continuous segments represent a separate handwritten character when the first distance exceeds a first threshold;

determining a second distance when the first distance does not at least exceed the first threshold, the second distance being substantially parallel to the writing axis and selected as a minimum distance from a plurality of distances between left-most points of the first discrete continuous segment and right-most points of the second discrete continuous segment in a like plurality of bands being substantially parallel to the writing axis; and determining that the first and second discrete continuous segments represent a separate handwritten character when the second distance exceeds a second threshold.

9. A method comprising the steps of:

receiving handwritten character input, which handwritten character input is comprised of at least a first and a second discrete continuous segment positioned along a writing axis;

defining a first and a second boundary which are substantially perpendicular to the writing axis;

calculating the first boundary by finding the point in the first discrete continuous segment that has the largest displacement from a reference point along the writing axis;

calculating the second boundary by finding the point in the second discrete continuous segment that has the smallest displacement from the reference point along the writing axis;

determining that the largest displacement of the point in the first discrete continuous segment is greater than the smallest displacement of the point in the second discrete continuous segment;

calculating a negative value by subtracting the smallest displacement of the point of the second discrete continuous segment from the largest displacement of the point of the first discrete continuous segment; and using the negative value to determine whether the first and second discrete continuous segments belong to separate handwritten inputs.

* * * * *